(12) United States Patent
Enyeart

(10) Patent No.: US 11,285,802 B2
(45) Date of Patent: Mar. 29, 2022

(54) ALL IN ONE FUEL TANK ASSEMBLY

(71) Applicant: Daniel Ray Enyeart, Gladstone, OR (US)

(72) Inventor: Daniel Ray Enyeart, Gladstone, OR (US)

( * ) Notice: Subject to any disclaimer, the term of this patent is extended or adjusted under 35 U.S.C. 154(b) by 433 days.

(21) Appl. No.: 16/394,554

(22) Filed: Apr. 25, 2019

(65) Prior Publication Data
US 2019/0248230 A1   Aug. 15, 2019

Related U.S. Application Data

(63) Continuation-in-part of application No. 15/357,024, filed on Nov. 21, 2016, now Pat. No. 10,744,869.

(51) Int. Cl.
*B60K 15/03* (2006.01)
*B60K 15/077* (2006.01)
*B60K 15/035* (2006.01)

(52) U.S. Cl.
CPC ........ *B60K 15/03006* (2013.01); *B60K 15/03* (2013.01); *B60K 15/077* (2013.01); *B60K 15/035* (2013.01); *B60K 2015/03032* (2013.01); *B60K 2015/0348* (2013.01); *B60K 2015/03217* (2013.01); *B60K 2015/03453* (2013.01)

(58) Field of Classification Search
CPC ............. B60K 15/03006; B60K 15/07; B60K 2015/03032; B60K 2015/03118; B60K 2015/03105
USPC ....................................................... 220/560
See application file for complete search history.

(56) References Cited

U.S. PATENT DOCUMENTS

| | | | | |
|---|---|---|---|---|
| 3,760,834 | A | * | 9/1973 | Shonerd .................... F17C 1/06 137/255 |
| 4,946,056 | A | * | 8/1990 | Stannard ................... F17C 1/08 220/584 |
| 5,398,839 | A | * | 3/1995 | Kleyn .............. B60K 15/03177 220/4.14 |
| 10,465,848 | B1 | * | 11/2019 | Newhouse ............... F17C 1/04 |
| 2014/0110412 | A1 | * | 4/2014 | Johnson ............ A47G 23/0216 220/560 |
| 2018/0136031 | A1 | * | 5/2018 | Moon .................... H01H 36/02 |
| 2019/0152646 | A1 | * | 5/2019 | Allan .................... B60K 11/02 |

* cited by examiner

*Primary Examiner* — Anthony D Stashick
*Assistant Examiner* — Raven Collins
(74) *Attorney, Agent, or Firm* — Ingrid McTaggart

(57) ABSTRACT

The present invention relates to an all in one fuel tank assembly, and a process of manufacturing the same, for use in commercial vehicles, and more particularly, to an all in one fuel tank assembly that allows multiple components to be manufactured as a single integral structure, such as a single extruded device including a draw tube, a return tube, a fuel sender device, and a vent, for example.

19 Claims, 2 Drawing Sheets

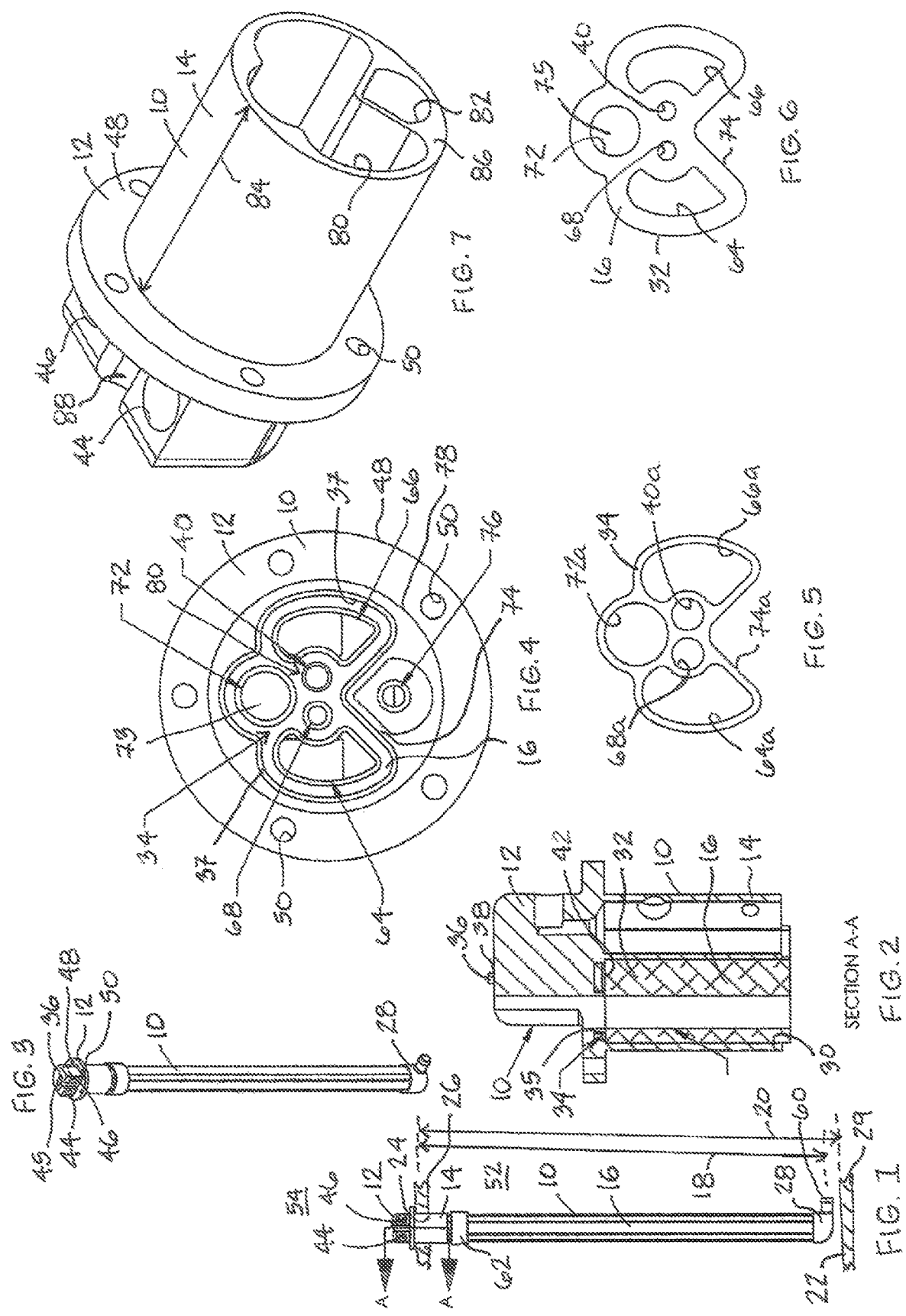

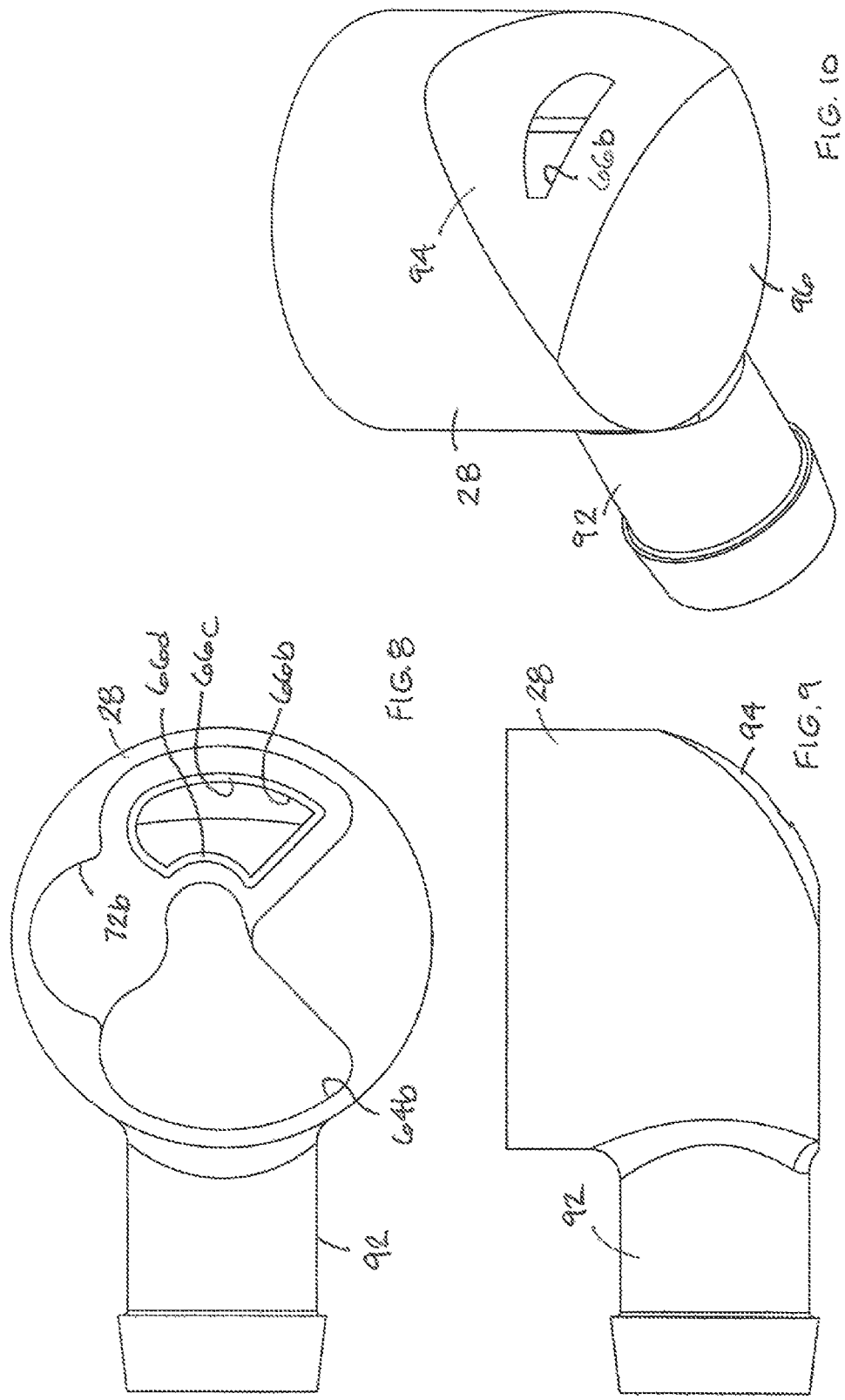

ALL IN ONE FUEL TANK ASSEMBLY

This application is a continuation in part of U.S. patent application Ser. No. 15/357,024, filed on Nov. 21, 2016, in the name of inventor Daniel Ray Enyeart.

1. Technical Field

The present invention relates to an all in one fuel tank assembly, and a process of manufacturing the same, for use in commercial vehicles, and more particularly, to an all in one fuel tank assembly that allows multiple components to be manufactured as a single integral structure, such as a single extruded device including a draw tube, a return tube, a fuel sender tube, an auxiliary tube, and a fastener aperture, for example.

2. Background of the Invention

The present invention is particularly intended for use on commercial vehicles, which may include multiple components secured to or in a fuel tank. Prior art fuel tanks typically include multiple components secured to or in the fuel tank, such as draw and return tube assemblies, pressure valves, fuel sender devices, or other components each separately mounted to or on the fuel tank. Each of these components generally communicates between an interior and an exterior of the fuel tank and is generally secured directly to the fuel tank. Accordingly, multiple components are secured to the fuel tank which may require an extensive amount of time to install, and an extensive amount of space on the fuel tank, and an extensive amount of time to separately manufacture.

Moreover, the separate components of the prior art may each include a tube to allow fuel communication between the exterior and an interior of the fuel tank. Each separate tube must be machined and then bent at a particular location along the length of the tube so that each tube will extend to the bottom of the fuel tank in which it is installed. Each bend of each tube should correspond to the depth of the particular fuel tank in which it is installed or the fuel tank assembly will not function as desired. The prior art process of bending multiple fuel tank assembly tubes is time consuming to manufacture and time consuming to install. There is a need, therefore, for a more efficient manufacturing and installation process, a space saving compact assembly that may be installed in smaller sized tanks, and an assembly that may be easily sized to fit a variety of tank depths.

SUMMARY OF THE INVENTION

The present invention provides an all in one fuel tank assembly, and a process of manufacturing the same, that overcomes the disadvantages of the prior art. One embodiment of the present invention provides a single integral, extruded device that includes a fuel draw line, an auxiliary fuel line, a fuel return line, a level sending unit cavity, a recess to receive a vent device, and a fastener aperture. Accordingly, separate devices need not be separately installed on a fuel tank, and need not each require a separate space on the fuel tank for installation. Moreover, the all in one assembly may be more cost effective to manufacture because all the components may be included in a single integral, extruded device, i.e., manufactured of a single piece of material. The integral all in one assembly of the present invention may also be more sturdy and able to withstand the punishing environment of commercial trucking then prior art single, separately installed devices.

BRIEF DESCRIPTION OF THE DRAWINGS

FIG. 1 is a side view of one example embodiment of an all in one fuel tank assembly.

FIG. 2 is a cross sectional view taken along line A-A of the all in one fuel tank assembly of FIG. 1.

FIG. 3 is an isometric view of the all in one fuel tank assembly of FIG. 1.

FIG. 4 is a top view of the all in one fuel tank assembly of FIG. 1 showing the top of an elongate member of the assembly surrounded by a flange of the assembly cap.

FIG. 5 is a top view of a gasket of the all in one fuel tank assembly.

FIG. 6 is a bottom view of an extruded portion of the all in one fuel tank assembly.

FIG. 7 is an isometric view of the cap of the all in one fuel tank assembly.

FIG. 8 is top view of an end fitting.

FIG. 9 is a side view of an end fitting.

FIG. 10 is an isometric view of an end fitting.

DETAILED DESCRIPTION OF THE PREFERRED EMBODIMENTS

The invention discloses an all in one fuel tank assembly that allows multiple components to be manufactured as a single integral, extruded structure, and there after secured to or removed from a fuel tank with use of a single flange. A single integral structure means that the structure may be manufactured from a single piece of material such as extruding the structure, molding the structure, or otherwise forming the structure from a single piece of material, such as a single piece of metal, namely, aluminum, for example. In a preferred embodiment an elongate member of the assembly is extruded, including five internal cavities and one external recessed cavity, wherein each cavity extends the full length of the extruded tubing, such that the extruded tubing has a cross sectional shape and cavity configuration that does not change along the complete length of the extruded tubing. Extruding the tubing allows for multiple components, i.e., multiple cavities, to be formed in a single, integral structure, and allows cutting the tubing to any desired length so that the assembly of the present invention may be sized for any fuel tank depth.

FIG. 1 is a side view of one example embodiment of an all in one fuel tank assembly 10. Assembly 10 may include, in one embodiment, a cap 12 including a mounting collar 14 region, and a tube 16 secured to the cap 12. Tube 16 may define a length 18 that may be sized as desired to correspond to a depth 20 of a tank 22 in which assembly 10 is secured. In an embodiment wherein tube 16 is extruded, the tube may be cut to a desired length 18 so that the assembly 10 may be installed within an aperture 24 in a tank wall 26 such that the tube 16 extends downwardly within tank 22 so that an end fitting 28 secured to tube 16 is positioned adjacent a lower region 29 of tank 22.

In this embodiment wherein tube 16 is extruded, and therefore completely uniform in shape and size completely along its length 18, the tube 16 may be cut to define a desired length 18 that will fit any sized tank depth, or other dimension as is desired, in which the assembly 10 is mounted. This is an advantage over prior art fuel tank assemblies which may include machined tubes that define a tube bend in a lower region, such that the bend of the machined tube will be positioned adjacent to a lower region of tank. In other words, in prior art fuel tank assemblies, the machined tubes must be precisely bent to define a bend in the tubes that corresponds to the depth of the tank in which the tube is placed. Each pipe of the prior art, therefore, must be bent to correspond to the tank depth in which the multiple tubes are installed, which is a time consuming and laborious process. The present invention in contrast, allows the manufacturer to simply cut extruded tube 16 to a desired length and then place an end fitting 28 on the extruded tube so that each cavity of the extruded tube, as will be described below, will have a length 18 that corresponds precisely to the tank depth 20 in which the assembly 10 is placed. Accordingly, the extruded tube 16 of the present invention, which includes multiple cavities therein, allows cutting the tube 16 to a desired length 18 and thereby eliminates the process of the prior art which requires bending of multiple tubes for use in a particular sized fuel tank.

FIG. 2 is a cross sectional view taken along line A-A of the all in one fuel tank assembly 10 of FIG. 1 and which shows a top or upper region 32 of tube 16 secured to cap 12 with the upper region 32 of tube 16 positioned within mounting collar 14 of cap 12. In particular, mounting collar region 14 of cap 12 includes a hollow recess 30 sized to receive therein upper region 32 of tube 16. A gasket 34 is positioned between top region 32 of tube 16 and surface 42 of cap 12 to create an airtight and fluid tight seal between tube 16 and cap 12 at gasket 34. Cap 12 further includes a fastener 36, such as a threaded screw, that extends through a fastener aperture 38 (FIG. 4) in cap 12 and a fastener aperture 40 (FIG. 4) in tube 16 so as to secure tube 16 to cap 12, with gasket 34 positioned there between. Cap 12 or tube 16 may include a gasket recess 35 or 37 (FIG. 4), respectively, to facilitate correct placement of the gasket 34 between cap 12 and tube 16, prior to securement of tube 16 to cap 12. Mounting collar 14 of cap 12 may provide a frictional fit of tube 16 within cap 12 to further secure tube 16 on the cap 12 and to reduce movement, such as rotational movement, of tube 16 with respect to cap 12. Mounting collar 14 and fastener 36 may function together, therefore, to provide a secure and rigid attachment of tube 16 to cap 12. Use of single fastener 36 to assemble the fuel tank assembly 10 of the present invention, which includes multiple fuel flow pathways, as will be discussed below, provides an advantage in that the assembly process of the present invention requires less time than the assembly process of the prior art. Moreover, the single fastener assembly process of the present invention reduces assembly error because the assembly technician need only secure one fastener 36 in one fastener aperture 40.

FIG. 3 is an isometric view of the all in one fuel tank assembly 10 of FIG. 1 showing a fuel draw port opening 44, a fuel return port opening 46, the top portion of fastener 36, and an auxiliary aperture 45, on cap 12. Cap 12 further includes a flange 48 with fastener apertures 50 spaced there around. Flange 48 may be placed on the sidewall 26 of a fuel tank 22 with mounting collar 14 of cap 12 and tube 16 extending downwardly through an aperture 24 (FIG. 1) of the fuel tank 22 and into an interior 52 of the fuel tank. In this position, port openings 44 and 46 will be positioned on an exterior 54 of fuel tank 22 and will be accessible for connection to draw and return fuel lines (not shown), respectively. Fasteners may be secured through fastener apertures 50 to tank wall 26 so as to releasably secure assembly 10 to a fuel tank 22.

Due to the elongate shape of tube 16, a float 62 mounted around tube 16, and the relatively small size of end fitting 28, including outwardly extending end fitting outlet 60, assembly 10 may be removed from a tank 22 through tank aperture 24. In this manner, the assembly may be replaced or repaired without damaging or further cutting into tank 22, or damaging assembly 10.

FIG. 4 is a top view of the all in one fuel tank assembly 10 of FIG. 1 with the cap 12 removed from mounting collar 14 of the all in one fuel tank assembly 10. In this end view of tube 16 the apertures of the extruded tube may be viewed, including draw aperture 64, return aperture 66, auxiliary aperture 68, tube fastener aperture 40, level sender unit aperture 72, gasket groove 37, and a recessed region 74 on an exterior of tube 16 so that a vent apparatus 76 may be fit within recessed region 74 of tube 16 to define a sleek outer circumferential shape 78 of tube 16 and vent apparatus 76 together. Draw and return apertures 64 and 66 of tube 16 are each kidney bean shaped apertures so that they, together with placement of level sender aperture 72, define a central region 80 of tube 16 wherein auxiliary aperture 68 and tube fastener aperture 40 may be positioned. "Kidney bean" shaped aperture is defined as an aperture having a first arcuate surface that is concave with respect to a central point, and a second arcuate surface that is concave with respect to the central point and is also positioned radially inwardly from said first arcuate surface. In FIG. 8 the first arcuate surface is 66*c* and the second arcuate surface is 66*d* of aperture 66*b*.

In the particular embodiment shown, kidney bean shaped draw and return apertures 64 and 66 are each sized to provide the same fluid flow rate as a fluid flow rate through a 0.5 inch inner diameter circular tube. They kidney bean shaped drawn and return apertures 64 and 66 are also contoured to fit around the 0.375 outer diameter cavity for the level sender unit components, the region for the vent component positioned within recessed region 74 of tube 16, and a 2 millimeter inner diameter auxiliary aperture 68 and a similarly sized tube fastener aperture 40. The gaps between these aperture features, seen in end view of tube 16 in FIG. 4, were designed to fit a 2 millimeter wide groove path or gasket recess 37 to seat gasket 34. The gasket 34 will provide a seal isolating all these apertures or cavities from each other through a compressive seal delivered by the fastener 36 through the tube fastener aperture 40.

The inventive concept includes utilizing an extrude shape tube 16 with multiple internal cavities or apertures for two purposes: to transfer fluid back and forth to a fitting external to the tank, such as through cap 12; and, to house level sender components 73, such as by plugging both ends of level sender aperture 72 with a plug 75 (FIG. 6) once a level sender unit 73 is installed therein, and to isolate them from the fluid atmosphere, wherein all the cavities are isolated from fluid communication with other cavities by use of a compressive seal, namely, gasket 34. This inventive concept may be applied to different extrusion shapes with different cavity configurations. The benefit of this inventive concept allows for multiple tank sizes to be fit with this apparatus 10 by cutting the extrusion 16 to an ideal length 18 for each different tank 22 size or depth 20. In other words, the fuel tank assembly apparatus 10, including multiple fuel tank components 64, 66, 68, 72 and 74, may be scaled upwardly or downwardly to fit any size fuel tank, by merely cutting an extruded tube 16 to a desired length 18.

FIG. 5 is a top view of gasket 34 of the all in one fuel tank assembly 10. Gasket 34 may be manufactured of any material as is desirable for a particular application, and in one embodiment may be manufactured of a flexible synthetic material such as plastic. Gasket 34 may also be manufactured or rubber or the like. Gasket 34 defines several apertures that correspond to the apertures 40, 64, 66, 68, 72 and 74 of tube 16, namely, gasket apertures 40*a*, 64*a*, 66*a*, 68*a*, 72*a* and 74*a*.

FIG. 6 is a bottom view of extruded tube 16 of all in one fuel tank assembly 10 of FIG. 5. In this bottom view apertures 40, 64, 66, 68, 70, and 72, along with recessed region 74 are shown.

FIG. 7 is an isometric view of the cap 12 including mounting collar 14 of the all in one fuel tank assembly 10. Mounting collar 14 defines an internal cavity 80 sized to frictionally receive therein top region 32 (FIG. 6) of tube 16. Mounting collar 14 also includes a second internal cavity 82 sized to frictionally receive therein vent apparatus 76 (FIG. 4). In the embodiment shown, mounting collar 14 has a length 84 of approximately two inches from flange 48 to end surface 86 of mounting collar 14, such that mounting collar 14 will rigidly hold tube 16 within cap 12 such that fastener 36 will firmly secure tube 16 to cap 12. This combination of mounting collar 14 and single fastener 36 (FIG. 2) provides a stable mounting structure for tube 16 to cap 12, even in harsh environmental conditions such as commercial trucking applications.

Still referring to FIG. 7, cap 12 includes draw port opening 44, return port opening 46, and a recessed region 88 that allows a level sender unit 73 (FIG. 4) to be placed into cap 12 and extend downwardly into tube 16. Level sender unit 73 may be sealed within level sender aperture 72 of tube 16 by plugging both ends of cavity 72 with plugs 75 after level sender unit 73 is installed therein, wherein electrical leads may extend through the upper plug 75 to allow electrical communication with level sender unit 73 positioned within tube 16. Plugs 73 may provide an airtight seal of cavity 72 so that level sender unit 73 is not in direct fluid contact with fluid held within fuel tank 22.

FIG. 8 is top view of end fitting 28 which, in the embodiment shown, includes a draw cavity 64*b* that communicates with draw cavity 64, auxiliary cavity 68 and fastener cavity 40 of tube 16. Draw cavity 64*b* of end fitting 28 extends outwardly of fitting 28 through barb fitting 92. A hose, not shown, may be attached to barb fitting 92 to separate fuel drawn into end fitting 28 from fuel tank 22 through barb fitting 92 and fuel returned to fuel tank 22 through a return cavity 66*b* of end fitting 28. Return cavity 66*b* of end fitting 28 communicates with return cavity 66 of tube 16 and communicates outwardly from end fitting 28 through inclined bottom surface 94 (FIG. 10) of end fitting 28. End fitting 28 further includes a recessed level sender region 72*b* that may secure therein an end of level sender unit 73 so as to secure the level sender unit in assembly 10 between cap 12 and end fitting 28.

FIG. 9 is a side view of end fitting 28 showing barb fitting 92 and inclined bottom surface 94. Inclined bottom surface 94 allows for placement of end fitting 28, and attached tube 16 (FIG. 1), to pass through a small fuel tank aperture 24 (FIG. 1) of fuel tank 22.

FIG. 10 is an isometric view of end fitting 28 showing fuel return aperture 66*b*, and inclined bottom surface 94. End fitting 28 may be secured to elongate member 16 by friction fit, welding, adhesive, a fastener passed through a flat bottom surface 96, or by any other method as may be desired.

As may be understood from the above description and drawings, the present invention has many advantages over prior art fuel tank assemblies. In the above description numerous details have been set forth in order to provide a more thorough understanding of the present invention. It will be obvious, however, to one skilled in the art that the present invention may be practiced using other equivalent designs.

I claim:

1. A fuel tank assembly, comprising:
a cap body including an internal cavity sized to receive therein a first end region of an elongate member;
an elongate member having a first end region sized to be received within said internal cavity of said cap body, said elongate member manufactured of a single, integral piece of material, the elongate member including a fuel return cavity, a fuel draw cavity, an auxiliary cavity, a level sender cavity, a fastener cavity, and an externally positioned recessed cavity sized to receive a vent apparatus therein, each said cavity extending continuously from said first end region of said elongate member to a second end region of said elongate member such that a cross section of said elongate member remains unchanged along a length of said elongate member from said first end region to said second end region of said elongate member;
a fastener that secures said elongate member to said cap body, said fastener extending through said cap body and into said fastener cavity of said elongate member; and
wherein each of said cavities of said elongate member are spaced from one another a distance of at least 2 millimeters so as to define a gasket recess that extends between each of said cavities on an end surface of said first end region of said elongate member.

2. The assembly of claim 1 wherein said fuel draw cavity and said fuel return cavity each define a kidney bean shape that together define there between a central region of said elongate member, said auxiliary cavity and said fastener cavity both positioned in said central region of said elongate member between said fuel draw cavity and said fuel return cavity.

3. The assembly of claim 2 wherein said fuel draw cavity and said fuel return cavity each define a cross sectional area sized to allow a fuel flow there through that corresponds to a fuel flow through a 0.5 inch inner diameter round tube.

4. The assembly of claim 1 further comprising a gasket positioned in said gasket recess and between said elongate member and said cap body when said elongate member is secured to said cap body, said gasket defining an airtight seal between said elongate member and said cap body around each of said fuel return cavity, said fuel draw cavity, and said auxiliary cavity of said elongate member.

5. The assembly of claim 1 wherein said cap body further includes a flange and a mounting collar extending downwardly from said flange, said internal cavity of said cap body positioned within said mounting collar.

6. The assembly of claim 1 further comprising an end fitting positioned on a second end region of said elongate member, opposite from said first end region of said elongate member, said end fitting including a fuel return aperture that allows fluid communication with an interior of a fuel tank on which said cap body is secured and said fuel return cavity of said elongate member, a fuel draw aperture that allows fluid communication with said interior of said fuel tank and said fuel draw cavity of said elongate member, an auxiliary fuel aperture that allows fluid communication with said interior of said fuel tank and said auxiliary cavity of said elongate member, and a plug that prevents fluid communication with said interior of said fuel tank and said level sender cavity of said elongate member.

7. The assembly of claim 6 wherein said cap body includes a fuel return aperture that allows fluid communication with an exterior of said fuel tank and said fuel return cavity of said elongate member, a fuel draw aperture that allows fluid communication with said exterior of said fuel tank and said fuel draw cavity of said elongate member, an auxiliary fuel aperture that allows fluid communication with said exterior of said fuel tank and said auxiliary cavity of said elongate member, and a level sender recess that allows electrical communication with said exterior of said fuel tank and said level sender cavity of said elongate member.

8. The assembly of claim 6 further comprising a float mounted around said elongate member, said float retained on said elongate member by said cap body and said end fitting.

9. The assembly of claim 6 wherein said cap body includes a flange extending outwardly from a mounting collar of said cap body, said flange secured to a tank wall around a tank wall aperture of said fuel tank such that said mounting collar extends downwardly into said tank wall aperture, wherein said end fitting has a size that allows movement of said end fitting and said second end region of said elongate member secured therein through said tank wall aperture so that said fuel tank assembly may be removed from and installed on said fuel tank without damaging said fuel tank assembly.

10. A fuel tank assembly, comprising:
a cap body including a flange adapted to be secured to an exterior wall of a fuel tank;
an elongate member having a first end region secured to said cap body, said elongate member manufactured of a single, integral piece of material, the elongate member including a first cavity, a second cavity, a third cavity, a fourth cavity, a fifth cavity, and an externally positioned recessed cavity, said first through fifth cavities each positioned within an interior of said elongate member, and each of said first through fifth cavities and said recessed cavity extending continuously from said first end region of said elongate member to a second end region of said elongate member such that a cross section of said elongate member remains unchanged along a length of said elongate member from said first end region to said second end region of said elongate member;
a single threaded fastener that secures said elongate member to said cap body, said fastener extending through said cap body and into said first cavity of said elongate member; and
wherein each of said cavities of said elongate member are spaced from one another a distance of at least 2 millimeters so as to define a gasket recess that extends between each of said cavities on an end surface of said first end region of said elongate member.

11. The assembly of claim 10 wherein each cavity is separate from one another and wherein each cavity includes a cross sectional dimension that remains unchanged completely along a length of said elongate member.

12. The assembly of claim 10 wherein said second and third cavities of said elongate member each define a kidney bean shape that together define a central region of said elongate member there between, said first and fourth cavities positioned within said central region between said second and third cavities.

13. The assembly of claim 10 further comprising a gasket positioned between said cap and said elongate member, said gasket providing an airtight compressive seal between each of said first through fifth cavities and said cap body and isolating each of said first through fifth cavities from one another.

14. The assembly of claim 10 wherein said elongate member defines a straight member completely along said length of said elongate member, and wherein said elongate member is formed from a single piece of material.

15. The assembly of claim 10 wherein said cap body includes a flange and a mounting collar extending downwardly there from, said mounting collar including an internal cavity that defines a cross sectional shape that corresponds to an external cross sectional shape of said elongate member such that said elongate member is frictionally positioned within said internal cavity of said mounting collar.

16. A fuel tank assembly, comprising:
a mounting body including a connector region, a tubing mount region, and a flange positioned there between, said mounting body including first, second, third, fourth and fifth internal cavities extending there through;
a single piece of tubing including first, second, third, fourth, and fifth internal cavities extending completely along a length of said tubing and corresponding to said first, second, third, fourth, and fifth internal cavities of said mounting body, said single piece of tubing secured to said mounting body at said tubing mount region and having a cross sectional shape and cavity configuration that remains constant along said length of said tubing; and
a gasket positioned between said tubing and said mounting body such that said gasket provides a compressive seal between said mounting body and said tubing and seal isolation between said first, second, third, fourth, and fifth cavity of said tubing and a corresponding first, second, third, fourth and fifth cavity of said mounting body.

17. The assembly of claim 16 wherein said tubing is cut to define said length, wherein said length is chosen to correspond to a depth of a fuel tank in which the assembly is installed.

18. The assembly of claim 16 wherein said tubing further includes an external recessed cavity, said assembly further comprising a vent apparatus positioned within said external recessed cavity of said tubing.

19. The assembly of claim 16 further comprising an end fitting, said end fitting secured to said tubing opposite said tubing from said mounting body, said end fitting including first, second, third and fourth internal cavities extending through said end fitting and corresponding to said first, second, third, and fourth individual internal cavities of said tubing so as to allow fluid communication between said first, second, third, and fourth internal cavities of said tubing and said first, second, third, and fourth internal cavities of said end fitting, said end fitting further including a plug that seals an end of said fifth internal cavity of said tubing to as to prevent fluid flow into said fifth cavity of said tubing through said end fitting.

* * * * *